United States Patent [19]

Hoffland

[11] Patent Number: 4,952,066
[45] Date of Patent: * Aug. 28, 1990

[54] METHOD AND APPARATUS FOR DILUTING AND ACTIVATING POLYMER

[76] Inventor: Robert O. Hoffland, 303 Silver Spring Rd., Conroe, Tex. 77303

[ * ] Notice: The portion of the term of this patent subsequent to May 31, 2005 has been disclaimed.

[21] Appl. No.: 314,891

[22] Filed: Feb. 24, 1989

[51] Int. Cl.⁵ ............................................. B01F 15/04
[52] U.S. Cl. .................................... 366/160; 422/135
[58] Field of Search ............... 366/160, 161, 162, 155, 366/241, 150, 307, 152, 154, 297, 279; 422/135, 134

[56] References Cited

U.S. PATENT DOCUMENTS

| | | | |
|---|---|---|---|
| 2,917,465 | 12/1959 | Begley | 366/155 |
| 3,321,283 | 5/1967 | Ewald | 366/307 |
| 3,807,701 | 4/1974 | Reid | 366/132 |
| 4,125,574 | 11/1978 | Kastner | 422/135 |
| 4,494,878 | 1/1985 | Rainey | 366/307 |
| 4,522,502 | 6/1985 | Brazelton | 366/160 |
| 4,747,691 | 5/1988 | Hoffland | 366/160 |

OTHER PUBLICATIONS

Stranco "Polyblend", Brochure for ARC(Accessory Retention Chamber) Copyright 1986.
Polyair ®Model 510, Brochure Copyright 1985.
Pennwalt Corp Brochure for Series 35-300 Automatic Systems for Producing Aged Polymer Solution, no date.

*Primary Examiner*—Robert W. Jenkins

[57] ABSTRACT

The invention comprises a combination concentrated polymer storage tank, mixing tank, and aging tank with a polymer deliver pump and water control valves to deliver the polymer and water to the mixing tank and aging tank. Additionally, the mixing tank provides a residence time for mixing of 30-45 seconds, and the aging tank provides an aging residence time of 2-10 minutes.

9 Claims, 2 Drawing Sheets

METHOD AND APPARATUS FOR DILUTING AND ACTIVATING POLYMER

BACKGROUND OF THE INVENTION

Various synthetic and naturally occurring water-soluble polymers have been developed which exhibit excellent thickening and flocculating properties. Most commonly used are acrylamide polymers which include poylacrylamide and its water-soluble copolymeric derivatives such as acrylamide-acrylic acid and acrylamide-acrylic acid salt which contains 95-5 percent by weight acrylamide. Copolymers of acrylamide with vinyl monomeric such as maleic anhydride, acrylonitrile, styrene, and the like are also useful. Other useful water-soluble vinyl polymers are described in detail in U.S. Pat. Nos. 3,418,237; 3,259,570; and 3,171,805. The polymers are generally available in powder form but useful only when dissolved in water.

One method of use has been to first disperse the polymer in a carrier such as oil. The polymer is generally highly concentrated in the carrier and must be diluted to a concentration of approximately 8%-10% in water or other diluents before use. One such method using a oil based carrier is disclosed in U.S. Pat. No. 3,624,019.

The polymers have molecular weights of up to 25,000,000. As such, they exist in the carrier in tight coils. The active sites for treatment of wastes are believed to be along the chain and in the coil form the polymers are not effective. In addition to being diluted, the polymers must also be allowed to uncoil to expose the active sites and activate the polymer.

Due to the size and length of these polymers, they must be mixed gently to prevent breaking up of the chains into smaller, less efficient particles. There is, therefore, presented a problem in the mixing and dispersion of polymer in diluent. If the polymer becomes uncoiled during mixing, it can be broken up. Methods and apparatus have been designed to disperse the polymer gently in water—see for example U.S. Pat. No. 4,522,502. Also my U.S. Pat. No. 4,747,691 mixes first then activates the polymer after mixing in an unagitated aging tank.

Drawbacks to both the above patents exist, in that mixing and aging times are not set out with particularly. For example, in my patent, the aging tank and mixing tank have substantially the same residence time. I have since discovered that this is not sufficient to get the best results from the polymer. Data indicate that the diluted polymer should not be agitated more than 30-45 seconds and should be aged for approximately 2-10 minutes. I have thus improved upon my earlier invention by providing an apparatus which provides the required mixing and aging times.

SUMMARY OF THE INVENTION

The invention thus comprises the mixing tank as disclosed in U.S. Pat. No. 4,747,691 which is herein incorporated by reference as if copied in its entirety. Additionally I have enlarged the aging tank and provided baffles to prevent direct channeling of the diluted polymer from the inlet to the outlet of the aging. tank. To make a more compact unit, I have mounted the mixing tank, polymer pump, and water rotameter on top of the aging tank, all of which may be skid mounted.

DESCRIPTION OF THE PREFERRED EMBODIMENT

Figure 1:
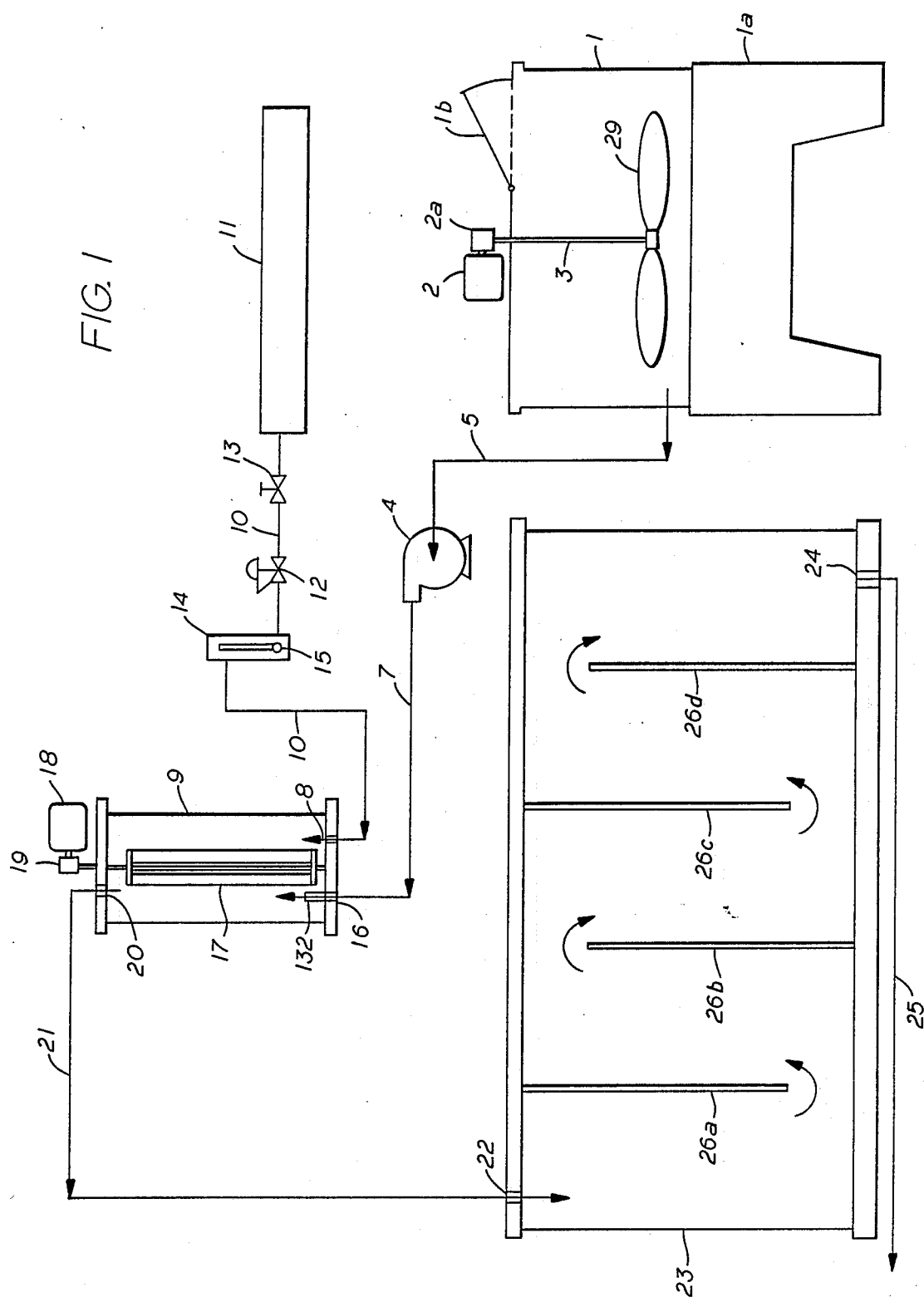
FIG. 1 is a simplified flow diagram of the invention.

Referring now to the FIGS. where like numerals indicate like components, the preferred embodiment of the invention is shown.

In FIG. a general flow diagram, the polymer which is carried in an oil based liquid, is stored in agitated storage tank 1. The agitator comprises an impeller 29 on a shaft 3 which is driven by motor 2 through coupling 2a. Lid 1b is provided to pour the concentrated polymer into the tank.

The suction of a metering pump 4 is connected by flow line 5 to the tank 1 The polymer/carrier is metered and pumped through flow line 7 to the polymer inlet 16 of mixing tank 9. Water is taken from a pressurized source 11 such as a city water system through flow line 10. A hand valve 13 in line 10 is provided to turn on the water when needed. A pressure regulator 12 in the line 10 assures a constant pressure source of water. Rotameter 14 is provided to monitor the water flow rate. The rotameter is provided with a needle valve 15 to adjust the water flow rate. Flow line 10 is connected to water inlet 8 in mixing tank 9.

The mixing tank 9 has an agitator 17 which is driven by motor 18 through coupling 19. The water and polymer/carrier enter though inlets 8 and 16 respectively, and are mixed together by agitator 17 until the polymer is dispersed in the water. The size of the mixing tank should be such that the polymer/carrier and water reside under the influence of the agitator for between 30-45 seconds. Less time would result in insufficient dispersion of the polymer/carrier in the water, and longer periods will break up the by then uncoiling polymer chains.

The continuous flow of water and polymer/carrier carries the diluted polymer by pressure through the mixing tank where it exits nears the top at mixing tank outlet 20 into flow line 21 which carries the diluted polymer to the aging tank 23. The diluted polymer enters the aging tank through inlet 22 where it is allowed to reside for 2-10 minutes to allow the long polymer chains to uncoil and become activated. After activation in the aging tank 23 the diluted polymer exit the aging tank through outlet 24 where is carried to the desired service through flow line 25. Internal baffles 26a-26d insure that the incoming diluted polymer flows through the entire volume of the aging tank instead of simply channeling out through the outlet.

The volume of the mixing tank 9 and aging tank 23 are selected upon the amount of polymer required and dilution desired. Usually the water flow is greatly in excess of the polymer/carrier and determines the residence time in each vessel. Knowing the water flow can thus normally allow one of ordinary skill to calculate the volume required to provide the required residence times in each of the tanks.

Figure 2:
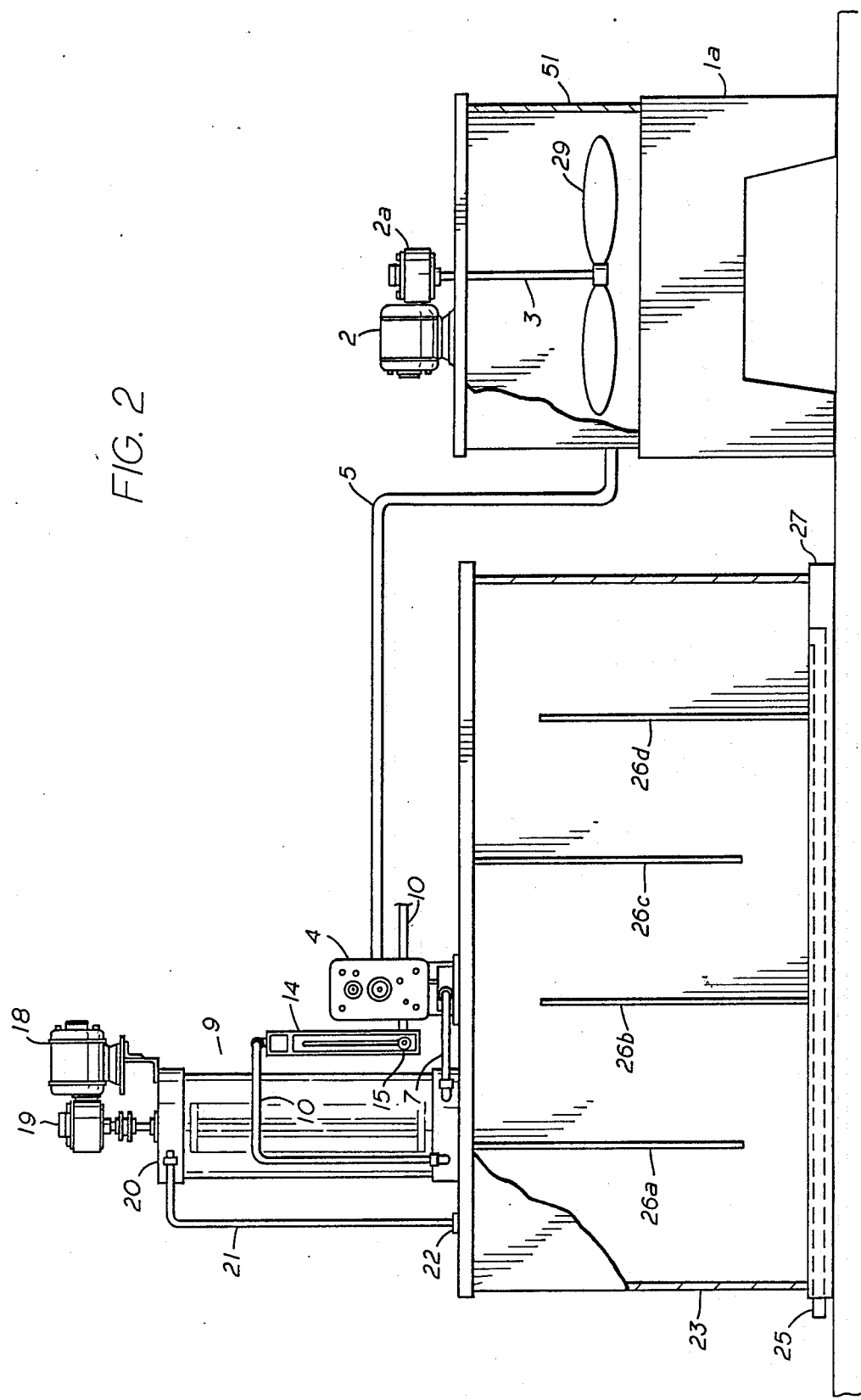
FIG. 2 is a side elevational view of the present invention.

FIG. 2 show the arrangement of the present invention as mounted on skid 27. Since the residence time required in the aging tank 23 is much longer than that required in the mixing tank 9, the volume is much greater. For convenience and compactness, the mixing tank along with metering pump 4 and rotameter 14 are mounted on top of the aging tank 23. The storage tank 1 for the concentrated polymer is shown mounted on legs 1a next to skid 27.

For a detailed description of the mixing tank 9 the reader is referred to U.S. Pat. No. 4,747,691 at column 3 line 33 to column 4 line 17 read in conjunction with FIG. 3 thereof, all of which is specifically incorporated by reference. The major difference between this invention and that disclosed in U.S. Pat. No. 4,747,691 is that the second cylindrical tank 23 (aging tank) shown in FIG. 3 thereof is not required since it has been replaced.

In operation and as illustrated in FIGS. 1 and 2, the concentrated polymer and carrier is loaded into the agitated storage tank 1 and the agitator 29 started by starting the agitator motor 2. The water delivery line 10 is connected to a suitable water source 11 such as a pressurized city water supply. The valve 13 is opened fully to supply water pressure to the system. The needle valve 15 on the rotameter 14 is then opened and adjusted to achieve the desired water flow rate. This allows the water to flow through flow line 10 and into water inlet 8 of mixing tank 9.

When the mixing tank 9 is filled with water, water flows out of outlet 20 at the top of the mixing tank 9 through flow line 21 and into the aging tank 23 through inlet 22. Finally, when the aging tank 23 is completely filled with water, water flows out through outlet 24 into flow line 25 to the service. When the desired water flow rate has been achieved, the agitator 17 in the mixing tank 9 may be started by starting the motor 18.

The flow of concentrated polymer and carrier may then be started by starting the metering pump 4 and setting it at the desired flow rate to achieve the desired dilution. The metering pump 4 takes suction from the storage tank 1 through the suction line 5 and pumps the concentrated polymer at precise rates through discharge line 7 and then through the polymer inlet 16 and check valve 132 into the agitated mixing tank 9 where it is mixed for 30-45 seconds and dispersed into the water.

The diluted polymer is then carried by the water through the outlet 20 and into the flow line 21 and thus to the aging tank 23 through inlet 22. The volume of the aging tank allows a residence time of from 2-10 minutes to allow the polymer chains to uncoil and expose the active sites. Finally, the diluted polymer flows through outlet 24 through flow line 25 to the service where it may be injected in the water treating facilities.

It should be realized that the above description is only one embodiment of the invention and is for illustration purposes. Many minor modifications may be made which fall within the scope of the appended claims.

What is claimed is:

1. An apparatus for continuously diluting and activating a polymer/carrier in water, comprising:
   a storage tank for containing the polymer/carrier;
   a stirred mixing tank for mixing and diluting said polymer/carrier with water, said mixing tank having a polymer inlet means, a water inlet means, and a mixing tank outlet means, said mixing tank being sized to provide a residence time of polymer/carrier and water in said mixing tank of between 30-45 seconds;
   a polymer delivery means for continuously delivering said polymer/carrier from said storage tank to said polymer inlet means at precise rates;
   a water delivery means for continuously providing water to said water inlet means at desired flow rates;
   an aging tank for activating said polymer after dilution in the water, said aging tank being sized to provide a residence time of the diluted polymer/carrier in said aging tank of between 2-10 minutes; and
   a means for continuously delivering the diluted polymer/carrier to said aging tank.

2. the apparatus of claim 1 wherein said storage tank comprises an agitated vessel having an agitation means to disperse said polymer within said carrier.

3. The apparatus of claim 1 wherein said mixing tank comprises:
   a substantially cylindrical chamber;
   a plurality of longitudinal rectangular baffles attached to the inner walls of said chamber, each of said baffles extending radially inward for substantially 1/12 of the diameter of said chamber;
   a rotatable mixing means disposed along the central axis of said chamber; and
   a means for rotating said mixing means.

4. The apparatus of claim 3 wherein said mixing means comprises a central shaft disposed along the central axis of said chamber and a plurality of rectangular paddles in spaced relation to said shaft and extending for the entire length of said shaft.

5. The apparatus of claim 1 wherein said polymer delivery means comprises a metering pump having a suction flow line connected to said storage tank and a discharge flow line connected to said polymer inlet means.

6. The apparatus of claim 1 wherein said water delivery means comprises:
   a connection means and water delivery line, said water delivery line being connected by said connection means to a suitably pressurized water source;
   a pressure regulator in said water delivery line to assure constant pressure; and
   a rotameter having a needle valve in said water delivery line for measuring and controlling the rate of water delivery.

7. The apparatus of claim 1 wherein said aging tank comprises a substantially rectangular tank having dilute polymer inlet and outlet means and anti-channeling means to prevent direct channeling of the diluted polymer from said dilute polymer inlet means to said dilute polymer outlet means.

8. The apparatus of claim 7 wherein said anti-channeling means comprises a plurality of baffles alternatively suspended from the top and extending from the bottom inside said aging tank.

9. A method for continuously diluting and activating a concentrated polymer/carrier in water, comprising the steps of:
   providing a separate storage tank, stirred mixing tank, and aging tank, said storage tank containing the concentrated polymer/carrier to be diluted and activated;
   agitating the polymer/carrier in the storage tank to insure even distribution of the polymer in the carrier;
   continuously moving the polymer/carrier at precisely controlled rates into the stirred mixing tank;
   continuously injecting water at controlled rates into the stirred mixing tank;
   continuously stirring the polymer/carrier and injected water for 30-45 seconds in the stirred mixing tank; and
   continuously moving the water and polymer/carrier from the stirred mixing tank to the aging tank wherein the polymer/carrier is allowed to age for 2-10 minutes in the water delivery to service.

* * * * *